Figure 1:
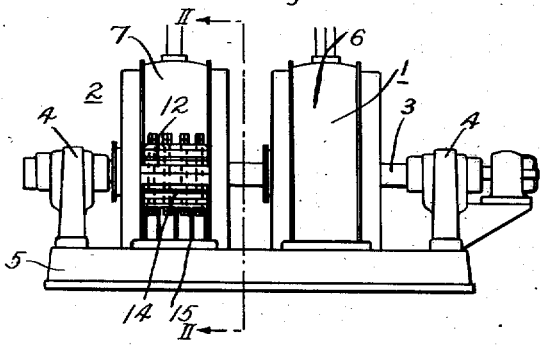

C. R. SODERBERG

June 6, 1933. VIBRATION ABSORBER Re. 18,861

Original Filed April 2, 1924 3 Sheets-Sheet 1

WITNESSES:
Fred. C. Wilhams
S M Pineles

INVENTOR
Carl R. Soderberg
BY
Wesley G. Carr
ATTORNEY

June 6, 1933.

C. R. SODERBERG

VIBRATION ABSORBER

Re. 18,861

Original Filed April 2, 1924 3 Sheets-Sheet 2

WITNESSES:

Fred. E. Williams

S. M. Pineles

INVENTOR

Carl R. Soderberg

BY

Wesley G. Carr

ATTORNEY

Fig. 10.
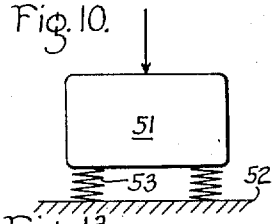
Fig. 11.
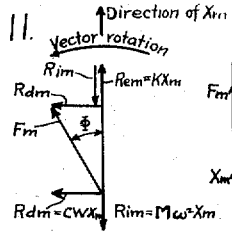
Fig. 12.
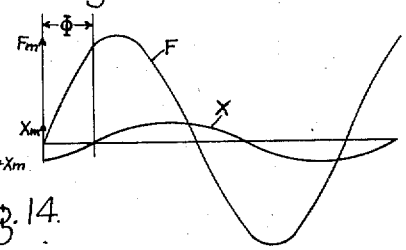
Fig. 13.
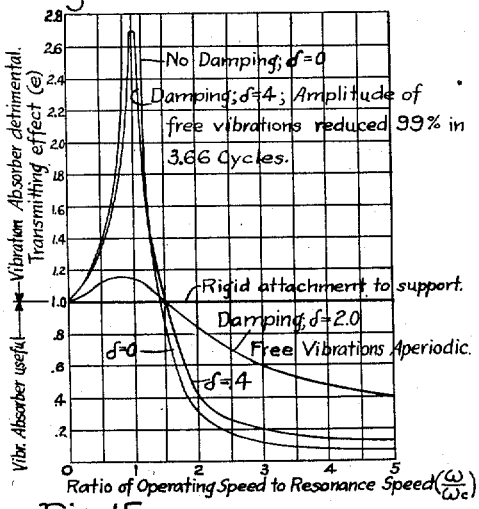
Fig. 14.
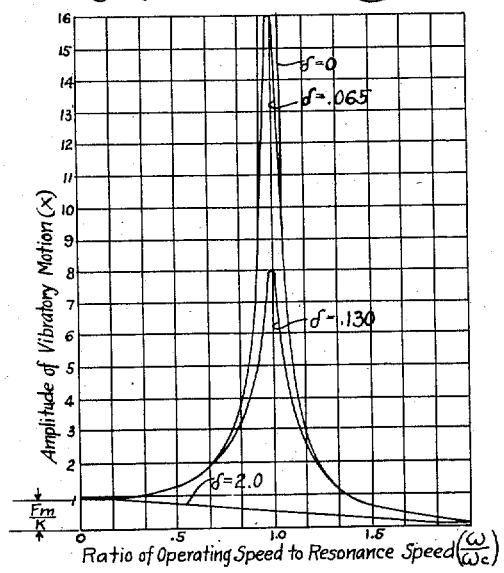
Fig. 15.
| Ref. Num. | Condition of Loading. | Efficiency of Loading. |
|---|---|---|
| 54 | Straight tension of Compression. | $\alpha = 1.0$ |
| 55 | Torsion of Straight Rod | $\alpha = 0.5$ |
| 56 | Coil Spring. | $\alpha = .375$ to $.500$ |
| 57 | Bending. | $\alpha = .111$ |
| 58 | Bending. | $\alpha = .111$ |
| 59 | Bending. a, L | $\frac{a}{L} = .25$; $\alpha = .222$ $\frac{a}{L} = .15$; $\alpha = .267$ |
Fig. 16.
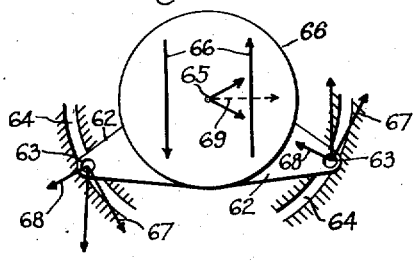
Fig. 17.
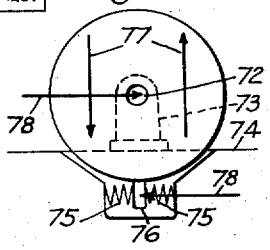
WITNESSES:
Fred. C. Wilhams
S. M. Fuelles
INVENTOR
Carl R. Soderberg.
BY
Wesley G. Carr
ATTORNEY Reissued June 6, 1933 Re. 18,861

UNITED STATES PATENT OFFICE

CARL R. SODERBERG, OF SWARTHMORE, PENNSYLVANIA, ASSIGNOR TO WESTINGHOUSE ELECTRIC & MANUFACTURING COMPANY, A CORPORATION OF PENNSYLVANIA

VIBRATION ABSORBER

Original No. 1,638,968, dated August 16, 1927, Serial No. 703,830, filed April 2, 1924. Application for reissue filed September 30, 1932. Serial No. 635,640.

My invention relates to vibration absorbers and it has particular relation to vibration absorbers for suppressing undesirable effects produced by periodically varying forces.

The present invention has been developed in connection with dynamo-electric machines wherein a periodically pulsating torque transmitted from the stator to the rotor produces pulsating reactions between the stator and foundation, which, in turn, result in foundation failures or in other highly undesirable effects.

It was early recognized that the problem of reducing the effect of periodically varying forces acting upon a foundation or the like is radically different from the problem of reducing the effect of irregularly occurring impulses. Thus, it has been realized that a mechanical system which is exposed to the action of periodically varying forces should have a natural frequency of vibration that is different from the frequency of the impressed forces, in order to avoid disastrous resonance effects multiplying the magnitude of the forces transmitted to the foundation.

In analyzing the problem of vibration absorption as met in dynamo-electric machines of the above-mentioned character, I have found that the principles which governed the prior designs of vibration absorbers, while avoiding the actual dangers caused by resonance effects, did not actually lead to constructions which diminish the magnitude of the forces transmitted to the foundation, but merely prevented an excessive increase of the same. I have found that by preserving a certain definite relation between the natural period of vibration of the system exposed to the periodically varying forces and the period of oscillation of said forces, vibration absorbers may be constructed which not only remove the dangers of resonance between the two frequencies but actually diminish the magnitude of the variations of the forces transmitted to the foundation.

One object of my invention is, therefore, to provide vibration absorbers that will reduce the magnitude of the variations of the transmitted force as compared to the variations of the disturbing force acting thereon.

Another object is to provide vibration absorbers constituting, in connection with the vibrating body, a mechanical system having a natural frequency that is equal to, or less than, $\frac{1}{\sqrt{2}}$ of the frequency of the impressed variations.

Where the periodical forces transmitted to a body, like the stator of a dynamo-electric machine, are torsional and tend to rotate the same, the reactive forces transmitted to the foundation by the stator must also be torsional. It is important that vibration absorbers designed for such machines shall positively prevent the introduction of forces tending to displace the stator from its central position. As fas ar I am aware, designers of vibration absorbers utilized heretofore in machines of the above-designated character did not realize the effect of the introduction of translational forces by improper design of the vibration absorbers. Accordingly, while attempting to reduce the effect of the undesirable variation of the torque, the vibrating body has been subjected to periodically varying translatory forces tending to displace the stator from its central position and thus impairing, to a large degree, the beneficial effects of the vibration absorber.

Accordingly, another object of my invention is to so design vibration absorbers for bodies exposed to periodically varying torsional forces as to resiliently oppose the action of said forces, without imparting to said body forces tending to change the path of the motion of the same.

Other objects of my invention relate to the details of construction of vibration absorbers whereby the available space is best utilized and a maximum absorbing effect is secured with a minimum of material.

Figure 2:
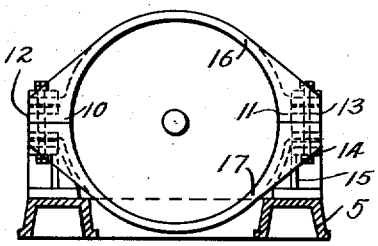
Figure 3:
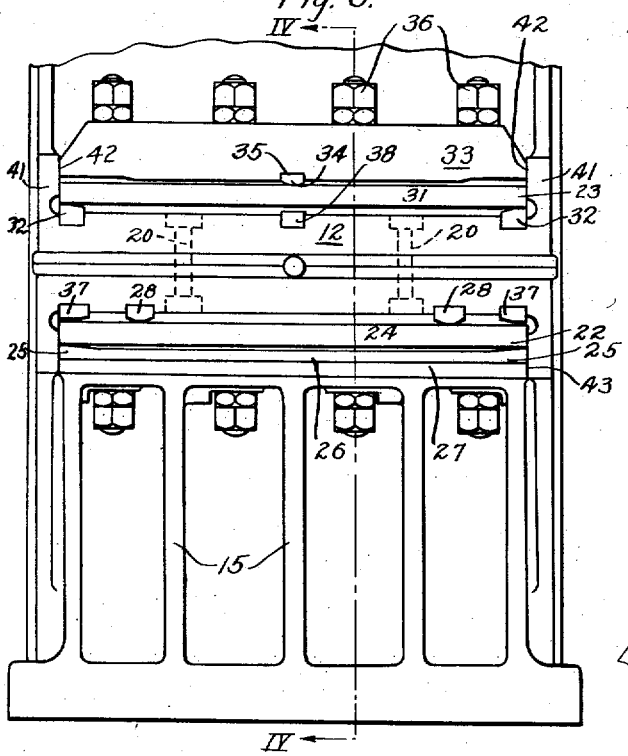
Figure 4:
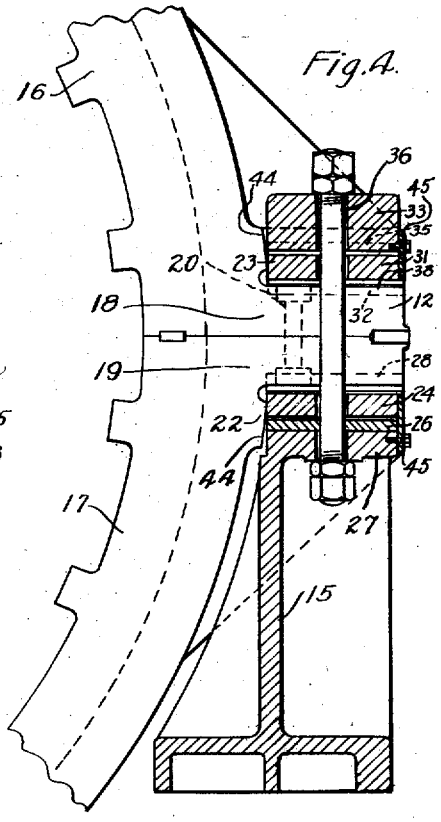
Figure 5:
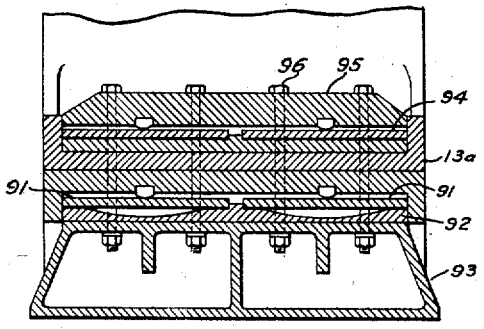
Figure 6:
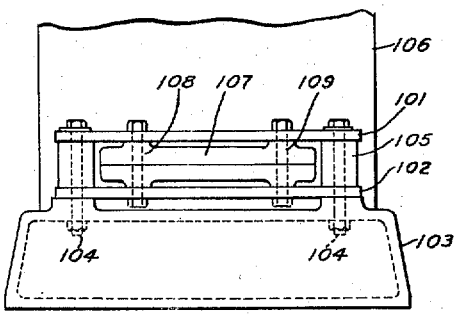
Figure 7:
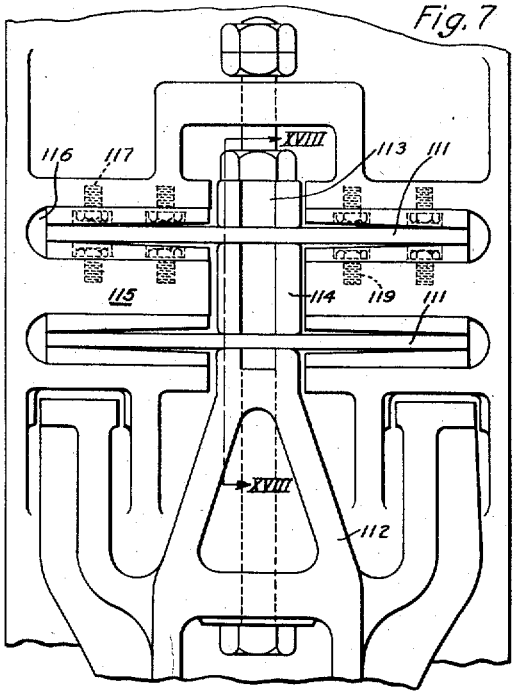
Figure 8:
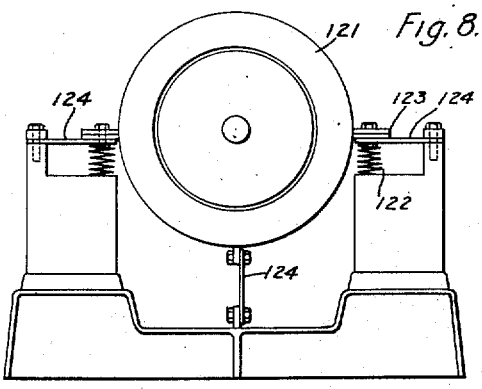
Figure 18:
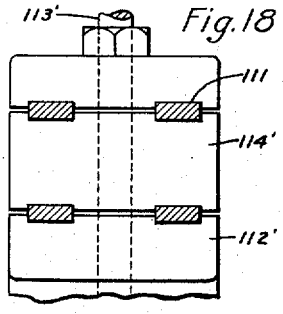

With the foregoing and other objects in view, my invention will best be understood by reference to the accompanying drawings wherein;

Figure 1 is a view in front elevation illustrating a motor-generator set utilizing a vibration absorber made according to my invention, Fig. 2 is an elevational view of the machine which is provided with a vibration absorber, Fig. 3 is an elevational view of one of the vibration absorbers shown in Fig. 1, and illustrating the same more in detail, Fig. 4 is a sectional view along the line IV—IV of Fig. 3, Figs. 5 to 7 are views similar to Fig. 3, of modifications of my invention, Fig. 8 is a view similar to Fig. 2, of a further modification, Figs. 9 to 17 are diagrams utilized to explain various features of my invention and referred to more fully hereinafter, and Fig. 18 is a sectional view along the line XVIII—XVIII of Fig. 7.

Referring to Figs. 1 and 2, a motor-generator set is shown comprising a polyphase motor 1 and a single-phase generator 2, the rotors of the two machines being mounted on a common shaft 3 supported by pedestal bearings 4 that are rigidly secured to a bed plate 5 constituting a part of the foundation. The stator members 6 and 7 of the polyphase motor 1 and the single-phase generator 2, respectively, are connected to the bed plate 5 and are held in a position concentric with the rotors. Since the power delivered to the polyphase motor is substantially continuous, and that delivered by the single-phase generator is periodically varying, corresponding to the alternations of the single-phase power delivered by the same, the stator 7 of the single-phase machine will transmit to the bed plate 5, torsional reactive forces that vary periodically in the same manner as the power delivered by the single-phase machine.

In order to eliminate the dangerous effects of the vibratory forces acting upon the foundation, the stator member 7 of the single-phase machine is provided with resilient means or vibration absorbers for making the torque-transmitting connection between the bed plate and the stator member. In the illustrated form of my invention, which is also the preferred form, the stator member 7 of the single-phase generator is provided, at the diametrically opposed portions 10 and 11, with lateral, horizontally disposed extensions 12 and 13 which are secured to the foundations by means of vibration absorbers 14.

As shown more in detail in Figs. 3 and 4, each vibration absorber comprises a pedestal member 15 secured to the bed plate 5 and extending upwardly for engagement with the horizontal stator extensions 12 and 13.

In the preferred construction shown in the drawings the stator is made of upper and lower halves 16 and 17, respectively, the two halves being secured to each other by means of flanges 18 and 19 meeting in a substantially horizontal plane and secured to each other by means of a plurality of bolts 20. The flanges 18 and 19 of the stator constitute the lateral stator extensions 12 and 13 mentioned hereinbefore.

The torque-transmitting connection between each of the pedestals 15, which are secured to the bed plate, and the corresponding lateral extension 12 or 13 of the stator is effected by means of a lower spring aggregate 22 and an upper spring aggregate 23. The lower spring aggregate 22 comprises a pair of flat plates or beam springs 24 of steel, supported at their ends upon the elevated end portion 25 of a steel plate 26 resting upon a horizontal extension 27 of the pedestal 15. Two pressure blocks 28, spaced from each other and from the supporting points of the beam springs, are secured in grooves extending radially in the lower side of the lateral stator extension 12 or 13 and transmit the reaction of the stator to the lower springs 24.

The upper spring aggregate 23 comprises two beam springs 31 of rectangular cross-section similar to the lower springs 24 and supported at their ends upon a pair of radially disposed pressure blocks 32 extending somewhat above the upper level of the lateral extension 12 or 13. A yoke 33 is disposed above the upper springs 23 and engages the same at mid-points 34 by means of a pressure block 35 of tempered steel extending downwardly from the lower surface of the yoke. The yoke 33 is spaced in fixed relation to the pedestal extension 27 by means of a plurality of tensioning bolts 36 clamping the whole spring assembly together.

The construction illustrated in Figs. 1 to 4 is intended for large machine units as, in general, the difficulties arising from the periodically varying torque is of primary importance mainly in connection with large machines. In any vibration-absorber construction utilized in connection with a dynamo-electric machine, it is imperative to maintain the concentric position of the stator with respect to the rotor, notwithstanding the arrangement of the vibration absorber and the operation of the same. It is accordingly usual practice to provide a rigid connection between the stator and the rotor shaft, as by means of end brackets secured to the stator and having trunnions surrounding the shaft. Such constructions are, in general, very bulky on account of the large dimensions of the co-operating machine members, and are particularly objectionable in large machines because of the intolerably large increase in the weight, as well as in the space, required by such machines. According to my present invention I depend entirely upon the vibration absorbers 14 for maintaining the stator in a central position while at the same time reducing the vibrations.

In the construction shown in Figs. 1 to 4, the weight of the stator, acting upon the lower springs 24 through the pressure blocks 28, will deflect the springs 24 downwardly. The final position of the stator at rest is determined by means of the yoke 33, which is pressed downwardly, by the tensioning bolts 36, toward the lateral extension 27 of the pedestal 15 and compresses the upper spring until the stator is brought into its final position with respect to the rotor. The provision of the upper spring aggregate 23 and of the yoke 33 prevents the stator from being thrown upwardly under the action of excessive jolts acting upon the stator, and at the same time, the upper spring aggregate is so arranged as to limit the movement of the lower springs to a range wherein the same are continually compressed in the downward direction. The significance of the last-mentioned feature will be pointed out later. The angular movement of the stator against the action of the springs tending to maintain the same in a neutral horizontal position is limited by means of keys 37 of tempered steel limiting the downward movement of the stator extensions 12 or 13 and a key 38 of tempered steel limiting the upward movement of the stator extension.

In the preferred construction illustrated in Figs. 3 and 4, movements of the stator in an axial direction are prevented by flanges 41 extending from the sides of the flanges 18 and 19, and having vertical faces 42 bearing against co-operating surfaces 43 of the pedestals 15 and spring assemblies 22 and 23, while radial movement of the stator in horizontal direction is prevented by substantially circularly shaped bearing portions 44 of the stator co-operating with cooperating bearing faces of the pedestals 15. If desired, light retaining or covering plates 45 may be screwed onto the members 33 and 27, as shown in Fig. 4, to retain the outer spring members 31 and 24.

In the design of the vibration absorbers employed in the machine shown in Figs. 1 to 4, I have employed certain principles which will best be explained by considering the problem of vibration absorption in a somewhat simplified and more generalized way.

*General principles*

Referring to Fig. 10, let us consider a mechanical system comprising a body 51 of mass M supported or cushioned upon a foundation 52 by two spring members 53, and subjected to a variable force F acting centrally upon the body in vertical direction.

It is the function of the vibration absorber to provide such connection between the foundation 52 and the body 51 which is acted upon by the variable force, as to make the force transmitted to the foundation as small as possible, and the effectiveness of the vibration absorber will be measured by the ratio of the force acting upon the foundation to the force acting upon the supported body. I term that ratio the transmitting effect $e$ of the vibration absorber and $(1-e)$ the cushioning effect of the vibration absorber.

*The impressed force is periodical*

Let it be assumed now that the force acting upon the supported body 51 is a periodic harmonic force given by the equation $$F=F_m \sin \omega t \text{ in pounds,} \quad (1)$$

where $F_m$ is the maximum amplitude of the force, $\omega$ is the angular velocity corresponding to a given periodicity of the force, termed the operating speed of the mechanism, and $t$ is the time.

The impressed force will be opposed by three groups of reactional forces: the inertia reaction $R_i$, the elastic reaction of the spring support $R_e$ and damping forces $R_d$. The expression for the relation of the forces may be derived from the equation for the motion of the mass M of the body 51.

The motion of a point of the mass under the influence of the periodic force F is expressed by the equation $$x=x_m \sin (\omega t-\Phi) \quad (2)$$

where $x$ is the deflection of a point from the position which it assumes when the reaction of the spring member is equal to the steady load, $x_m$ is the maximum amplitude of the periodic deflection and $\Phi$ is an angle expressing the difference in phase between the oscillation of the impressed force and the oscillatory movement of the mass M.

The reactional forces will then be as follows:

$$R_i=M\frac{d^2x}{dt^2}=M\omega^2x_m \sin (\omega t-\Phi+180°) \quad (3)$$

$$R_e=kx=kx_m \sin (\omega t-\Phi) \quad (4)$$

$$R_d=c\frac{dx}{dt}=cx_m \sin (\omega t-\Phi+90°) \quad (5)$$

In deriving Equations (4) and (5) it was assumed that the spring member has a scale of $k$ pounds per inch and that the damping force is proportional to the velocity of the motion, with $c$ as the factor of proportionality.

The relation between the various forces is given by the differential equation $$F=M\frac{d^2x}{dt^2}+kx+c\frac{dx}{dt} \quad (6)$$

and is represented vectorially in Fig. 11 in the manner usual in treating alternatingcurrent circuits. Fig. 12 illustrates graphically the variations of the force and the oscillatory motion of the body 51, as functions of time.

From the geometrical relations of the vectors shown in the diagram in Fig. 11, we have $$F_m = x_m\sqrt{c^2\omega^2 + (k - M\omega^2)^2} \quad (7)$$

$$x_m = \frac{F_m}{\sqrt{c^2\omega^2 + (k - M\omega^2)^2}} \quad (8)$$

The reaction on the foundation is the vectorial sum of the spring reaction and the damping reaction. A part of the latter will be represented by air resistance which will not react on the foundation. Neglecting this effect we have as the reaction on the foundation $$f_m = x_m\sqrt{k^2 + c^2\omega^2} \quad (9)$$

$$e = \frac{f_m}{F_m} = \sqrt{\frac{k^2 + c^2\omega^2}{c^2\omega^2 + (k - M\omega^2)^2}} \quad (10)$$

Neglecting the damping, we have $$e = \frac{k}{M\omega^2 - k} \quad (10a)$$

The physical significance of the derived expressions will appear more clearly by introducing an expression $$\omega_c = \sqrt{\frac{k}{M}} \quad (11)$$

for the resonance speed of the system, or the angular velocity corresponding to the natural period of the mechanism, and an expression $$\delta = \frac{c}{M\omega} \quad (12)$$

for the damping coefficient of the motion.

The resonance speed $\omega_c$ is obtained by equating the second term in the denominator of Equation (8) to zero which corresponds to the condition of maximum amplitude of the oscillation.

Substituting expressions (11) and (12) in (10) and (10a) we have $$e = \sqrt{\frac{\delta^2\left(\frac{\omega}{\omega_c}\right)^2 + 1}{\delta^2\left(\frac{\omega}{\omega_c}\right)^2 + \left[1 - \left(\frac{\omega}{\omega_c}\right)^2\right]^2}} \quad (13)$$

$$e = \frac{1}{\left(\frac{\omega}{\omega_c}\right)^2} - 1 \quad (13a)$$

The curves in Fig. 13 represent the transmitting effect $e$ as a function of the ratio $\frac{\omega}{\omega_c}$ of the operating speed to the resonance speed for different values of damping, one curve corresponding to the condition of an undamped oscillation; another curve corresponding to the condition $\delta = 0.4$, where the damping reduces the amplitude of the oscillation to one one-hundredth of its original value in 3.5 cycles, and a still other curve corresponding to an aperiodic system with $\delta = 2$.

As far as I am aware, designers of vibration absorbing devices known in the prior art believed that all that was necessary to make a good vibration absorber was to make the resonance velocity of the system different from the operating velocity. The design was a hit-or-miss proposition. Sometimes unexpectedly good results were obtained, and sometimes equally unaccountably poor results would be obtained.

However, from the curves in Fig. 13, it may be seen that merely making the resonance frequently different from the operating frequency is not the only criterion, and that the transmitting effect is above one for all values of $\frac{\omega}{\omega_c}$ smaller than approximately $$\sqrt{2} = 1.41,$$

i. e., the force transmitted to the foundation is larger than the disturbing periodical force F and such vibration absorber is in fact detrimental, although its resonance velocity is different from the operating velocity. Thus, no cushioning is obtained if the resonance speed is above about 70% of the operating speed. The prior-art requirement merely tried to avoid making the natural period of the system of the order of the periodicity of the disturbance but did not otherwise discriminate which frequency shall be larger and which smaller. In order to obtain a considerable cushioning it is necessary to place the resonance speed at one-third to one-fourth of the operating speed. For example, with a low damping, the transmitting effect is only 0.1 when the operating speed is 3.32 times the resonance speed.

The effect of damping upon the performance of the vibration absorber requires special consideration. In the range wherein the vibration absorber acts detrimentally, large damping reduces the transmitting effect and thus acts beneficially. It is advisable, therefore, to introduce damping whenever a system operates within a range where the operating velocity is less than 1.41 of the resonant velocity. On the contrary, when operating at higher velocities, a reduction in the damping produces a reduction in the transmitting effect and is then beneficial.

The Equation (8), expressing the motion of the suspended body, may be written in terms of the resonant velocity and damping factor as $$x_m = \frac{F_m}{M\omega^2} \frac{\frac{\omega^2}{\omega^2_c}}{\sqrt{\delta^2 \frac{\omega^2}{\omega^2_c} + \left(1 - \frac{\omega^2}{\omega^2_c}\right)}} = \frac{F_m}{k} \frac{1}{\sqrt{\delta^2 \frac{\omega^2}{\omega^2_c} + \left(1 - \frac{\omega^2}{\omega^2_c}\right)^2}} \quad (14)$$

The amplitude of the vibratory motion of the cushioned mass given in Equation (14) is represented as a function of the ratio of the impressed velocity to the resonance velocity in Fig. 14, for different values of the damping factor. The motion of the cushioned mass grows from a value $\frac{F_m}{k}$ for $\frac{\omega}{\omega_c} = 0$ to a maximum value at resonance, $\frac{\omega}{\omega_c} = 1$, and diminishes asymptotically to zero.

By comparing Figs. 13 and 14, it appears that the motion of the cushioned mass is reduced in proportion to the transmitting effect of the vibration absorber. In contradiction to the usual belief, the motion of the cushioned mass is reduced as the cushioning effect (1—$e$ is improved, or as the periodical force transmitted to the foundation is reduced.

In the foregoing analysis of the principles of vibration absorbers, I have assumed ($a$) that the foundation is rigid, ($b$) that the spring has a straight-line characteristic, or that $k$ is constant, and ($c$) that ideal velocity damping is obtained, i. e., that the damping is directly proportional to the velocity of motion.

The assumption concerning the rigidity of the foundation is purely theoretical. If such were the case, it would be best to make the connection between the supported mass and the foundation rigid permitting the entire magnitude of the disturbing force to be transmitted to the foundation; no vibration absorber would be needed. It is through the imperfect nature of the support that the real problem is created.

Since no foundation is perfectly rigid, the effects of variable forces acting upon the foundation may be entirely beyond control. The very necessity for a vibration absorber indicates that the foundation possesses elastic properties of such nature that impulses of the operating frequency produce undesirable results. Usually, the undesirable results manifest themselves in adjoining structures. It is evident, however, that as long as the flexibility of the vibration absorber is great in comparison with that of the foundation itself, the former, if properly constructed, will accomplish a reduction of the impressed impulses. This is all that can be expected; the foundation and the adjoining structures will remain receptive to the same frequencies as before, but the disturbances will be diminished in proportion to the transmitting effect of the vibration absorber.

Naturally, a more fundamental measure would be to change either the operating frequency or the elastic properties of the adjoining structures. The proper application of vibration absorbers should be restricted to cases where such measures are impossible.

The assumption of the constant scale of the vibration absorber is also of a theoretical nature. As a matter of fact, it is usually desirable to arrange vibration absorbers with a rising scale in order to limit the maximum stress for extreme load conditions. This does not affect our results, however. It is merely necessary to consider the range of spring scale that occurs within the range of the load. The cushioning effect will be a function of the load; naturally the arrangement should be such that at the maximum load the cushioning effect of the vibration absorber is a maximum. In most practical cases, the vibratory deflections of the vibration absorber, for a specific load, are so small that the assumption of a constant spring scale is correct.

The assumptions concerning the damping are approximately correct for vibration absorbers of organic materials having high internal friction. In other cases, the damping will be produced by rubbing friction which does not conform to the velocity law. As shown hereinbefore, the damping is detrimental for ordinary cases of vibration absorption, so that nothing will be gained by the introduction of friction, except in cases of irregular variations of the disturbances. Furthermore, the effects of a moderate amount of damping are very small. The real objection to internal friction in the material for vibration absorbers is the deterioration resulting from such damping. Mechanical friction is even more detrimental than the friction damping which has been considered in our analysis. It is desirable, therefore, to arrange the design in such a manner that mechanical friction is avoided.

The foregoing analysis is valid for a variety of mechanical arrangements. It is only necessary that the system shall have one degree of freedom and, consequently, one resonance speed. For example, it will apply equally well to a flexible coupling between two rotating shafts as to a flexible support for the stator of an electric machine. The expressions for the resonance speed and for the damping must, of course, be adjusted to suit the specific system.

In our present case of a rotative system, the spring scale $k$ represents a torsional spring scale in inch-pounds per radian and the mass M must be replaced by the moment of inertia.

*The required volume of spring material*

A practical vibration absorber should give a maximum of effectiveness in cushioning the supported mass with a minimum requirement of space and material. Probably because of insufficient analysis and understanding of the problem, prior art devices employed unconscionably large amounts of material, with attendant large space requirements, in order to obtain even a slight degree of effectiveness. According to my invention, it is possible to fully design the vibration absorber with any desired degree of effectiveness and with the best utilization of material and space.

Vibration absorbers may be made either of steel springs or of different kinds of organic materials, such as leather, rubber, wood, cork and various compounds. A great deal of experimenting has been done with vibration absorbers of the latter kind. The results are most varied, presumably because all factors have not been properly taken into account in the design. Steel springs must be used in all cases where a heavy load has to be carried.

The most objectionable properties of the organic materials, in their application to vibration absorbers, are the variable elastic properties, and the deterioration caused by aging and internal friction. The internal friction is not always undesirable in itself, provided that it is obtained without destruction of the absorbers.

Most of the organic materials have the property of a variable modulus of elasticity for varying loads. In order to apply such vibration absorbers intelligently it is necessary to have a thorough knowledge of their elastic properties. It is usually necessary to study these properties in test pieces of full size because the properties vary for pads of different dimensions.

As a general rule, it may be stated that the results are always uncertain when organic materials are used.

I prefer to employ flexible members of steel, which may be arranged to have all the desirable properties of organic materials and none of their disadvantages.

In applying the foregoing principles to the design of a vibration absorber, such as that shown in Figs. 3 and 4, it is best to select the degree of flexibility which gives a tolerable value of transmitting effect. It is desirable to make the transmitting effect as low as possible, but as soon as the flexibility is low enough to place the resonance speed at one-third to one-fourth of the operating speed, additional flexibility produces very slight gain in the cushioning effect, as shown in Fig. 12. The fact just mentioned is of considerable importance, because a seemingly impossible application may frequently be reduced to a feasible case by a slight reduction in the requirements of cushioning.

If the vibration absorber has to carry a certain maximum load P, under which it deflects a certain amount $x$, the potential energy U, which it absorbs for this deflection is,—

$$U=\frac{Px}{2} \quad (15)$$

If the spring scale of the vibration absorber is $k$ we have $$P=kx \text{ or } x=\frac{P}{k} \quad (16)$$

$$U=\frac{P^2}{2k} \quad (17)$$

The units of the quantities in these expressions should, of course, correspond to the specific arrangement under consideration. If P is a moment in inch-pounds, $k$ will be a torsional spring scale in inch-pounds per radian and $x$ will represent an angle in radians. If P is a force in pounds, $k$ will be a linear spring scale in pounds per inch and $x$ will be a length in inches. In both instances U will be expressed in inch-pounds.

With a given operating frequency, the transmitting effect is smaller the smaller the resonance velocity $$\omega_c=\sqrt{\frac{k}{M}},$$

and the resonance velocity is smaller the smaller the spring-scale $k$. This means, when considered in connection with expression (17), that the effectiveness of a vibration absorber depends on its ability to absorb potential energy.

If a certain element of volume $dv$ of the spring-material is under a certain stress $p$ and its modulus of elasticity is E, the potential energy absorbed by virtue of this stress will be—

$$dU=\frac{p^2}{2E}dv \quad (18)$$

The total potential energy of the spring member is, therefore,—

$$U=\int\frac{p^2}{2E}dv \quad (19)$$

The integration should be extended to all active elements of the vibration absorber. If we denote the total volume in cubic inches by $v$ and the maximum stress in pounds per square inch by $p_m$, we may write the equation as follows:

$$U=\frac{p^2{}_m v}{2E}\alpha \quad (20)$$

The coefficient $\alpha$ represents the efficiency of the loading and expresses the degree to which the different elements of a spring are brought into stress, or the extent to which the stress in all the different elements of a spring approaches the maximum stress to which the spring is subjected. Its maximum value is unity, which occurs for a member in straight tension, all the elements of such member being under the same stress. In case of steel, the modulus of elasticity E has the value $30\times10^6$ when the stress $p_m$ represents tension or compression, and a value of $11.5\times10^6$ when the stress $p_m$ represents shearing.

By equating Equations (17) and (20) we obtain an expression giving the relation between the load P, the scale $k$, the maximum stress $p_m$ and the volume of spring material $v$.

$$\frac{P^2}{2k}=\frac{p^2{}_m v}{2E}\alpha \quad (21)$$

From equation (10$a$) we have $$k=\frac{e}{1+e}M\omega^2 \quad (22)$$

If this is introduced into Equation (21) we obtain $$v=\frac{P^2E}{p_m{}^2\alpha}\frac{1}{M\omega^2}\frac{1+e}{e} \quad (23)$$

This represents the volume of spring material required to produce a vibration absorber with a transmitting effect $e$.

Equation (23) is especially useful in the preliminary design of vibration absorbers. The possibility of obtaining a sufficient amount of cushioning depends upon whether or not it is possible to find room for the required volume of spring material. I accordingly so arrange the vibration absorber as to make the volume $v$ a minimum for a given transmitting effect, by making the coefficient of loading $\alpha$ a maximum.

In the following table are given the values of the loading coefficient for different arrangements of steel springs illustrated diagrammatically in Fig. 15.

| Condition of loading | Kind of spring | Efficiency of loading |
|---|---|---|
| Straight tension or compression. | Rod of uniform cross-section (54). | $\alpha=1.0$. |
| Torsion | Round rod of uniform cross-section (55). | $\alpha=.5$. |
| Tension or compression. | Coil spring of round uniform cross-section and $n$ turns (56). | $\alpha=.5\frac{n-1}{n}=.375$ to $.500$ ($n$ larger than 4.) |
| Bending | Beam of rectangular cross-section supported at ends with concentrated load in the middle (57). | $\alpha=.111$. |
| Bending | Cantilever (58) | $\alpha=.111$. |
| Bending | Beam of length L supported at ends with two concentrated loads at distance $a$ from each end (59). | $\alpha=.222$ for $\frac{a}{L}=.25$. $\alpha=.267$ for $\frac{a}{L}=.15$. |

The loading coefficient depends entirely upon the stress distribution. The potential energy per unit volume depends upon the actual values of the maximum stress and the modulus of elasticity as well. The table has been prepared under the assumption that the modulus of elasticity of steel in shear is 0.385 times the modulus of elasticity in tension or compression.

It is evident, from the table, that the required volume of spring material is largely dependent upon the method of loading the springs. The configuration of the available space will determine which type of spring will give the best space efficiency. The required volume is further dependent on the maximum permissible stress and on the modulus of elasticity of the spring material.

*The practical design of vibration absorbers*

In the practical construction of vibration absorbers, the resilient members, providing the torque-transmitting connection between the body exposed to the disturbing forces and the foundation, must be so designed as to constitute, in connection with the moving body, a mechanical system having a natural frequency of vibration which is considerably smaller than $$\frac{1}{2}\sqrt{2}$$

of the frequency of the variations of the disturbing forces. The resilient members should have the smallest possible spring scale and should be capable of storing a maximum of potential energy. I have found that flat spring plates or beam springs are most suitable for that purpose, since such springs give a better utilization of the available space than coil springs, notwithstanding the higher loading efficiency of the latter. It is the combined effect of the amount of spring volume that may be placed in a given space, the loading efficiency of the spring and the spring scale that determines the superiority of one construction over another.

Among the several constructions that may be employed in connection with beam springs, that wherein a beam spring is supported at two points and loaded at two other points spaced from each other and from said first mentioned two points is most suitable, since it readily permits variations in the spring scale and secures a higher loading efficiency than is possible with the other spring constructions. The construction employed in the vibration absorber illustrated in Figs. 3 and 4 is of that character.

There are certain definite requirements that must be fulfilled in order to avoid the introduction of translational unbalancing forces by the operation of the vibration absorber. Such unbalancing forces occur, for instance, in the arrangement shown in Fig.

16 where a stator 61 is provided at its base, with a pair of extensions 62 having rolling members 63 which are held in circular grooves 64 for permitting rotational movement of the stator around its axis 65. Under the action of a couple of forces 66, the stator tends to rotate counter-clockwise. The action of the couple 66 may be counteracted by a couple of forces acting at the supporting points 63 of the stator. Such a support, in order to be effective for reducing the vibrations, would require, however, that the stator shall move out of the circular path to which it is confined. If the movement is restricted to a purely circular path such as in the case illustrated in the drawings, the forces acting upon the foundation may be resolved into components 67, which act in tangential relation and which may be opposed by resilient members, and components 68 acting radially directly on the supporting structure. The components acting in radial direction give a resultant force 69, tending to displace the stator in a lateral direction.

A construction employing vibration absorbers acting upon supporting point corresponding to the conventional supporting points of stators of dynamo-electric machines thus produces laterally acting vibratory forces which are not cushioned by the vibration absorbers and may very often prove disastrous on account of the resonance frequency which the system may have for vibrations in lateral directions.

Similar conditions obtain in the arrangement shown in Fig. 17, wherein a stator member 71 is provided with trunnions securing the same centrally with respect to a shaft 72 which is supported on pedestal bearings 73 mounted upon the foundation 74. The stator is prevented from rotation by means of two spring members 75 acting upon a projection 76 extending downwardly from the stator. A couple of forces 77 tending to rotate the stator is counteracted by a couple of forces 78 acting through the pedestal bearings 73 and through the spring members 75, respectively. The forces acting upon the pedestal bearing are not cushioned by the action of the spring members and the purpose of the vibration absorber, therefore, is not well fulfilled.

In the construction shown in Figs. 1 to 4, the resilient means preventing the rotation of the stator act perpendicularly to a horizontal plane through the axis of rotation of the stator, at points which are disposed diametrically opposite to the stator axis. A couple of forces tending to rotate the stator is opposed by resilient springs reacting in the direction of rotation and producing a reactional couple of forces of equal magnitude without introducing translational forces tending to remove the stator from its central position.

Figure 9:
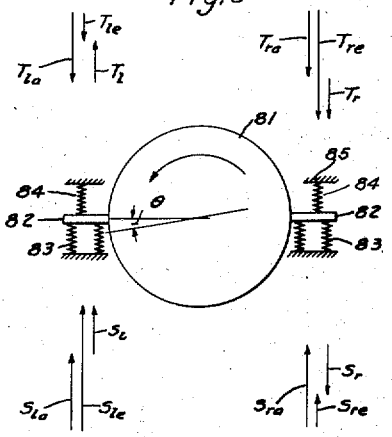

The arrangement of an upper and a lower spring aggregate on each side of the stator member, as shown schematically in Fig. 9, is intended to provide a convenient arrangement for determining the central position of the stator when at rest and also to secure the stator from being thrown upwardly under the action of sudden jolts of the machine. In this connection it is important to so design the upper spring aggregate as to leave the scale of the resilient means acting upon the stator extension as small as possible. This may be understood by considering the forces acting upon the stator member as shown in Fig. 9. The stator member 81 is provided, at diametrically opposite points, with extensions 82 which are held between lower spring aggregates 83 and upper spring aggregates 84 that are supported upon the foundation 85. It is assumed that the reaction of the lower spring aggregates, when at rest, is given by the vectors $S_{la}$ and $S_{ra}$ and the reaction of the upper spring aggregates, when at rest, is given by the vectors $T_{la}$ and $T_{ra}$.

Under the action of a couple of forces having a torque "Q" tending to rotate the stator in the counter-clockwise direction, the stator is deflected from the neutral horizontal position by an angle $\theta$ until the reactions of the spring aggregates 83 and 84 balance the couple. The reaction of the left hand, lower spring member after the stator is deflected is given by the vector $S_{le}$ and that of the right-hand, lower spring member by the vector $S_{re}$. The difference between the spring reactions under rest and after the stator was deflected by the angle $\theta$ is represnted by the vectors $S_l$ and $S_r$ which represent the reaction of the lower spring members to the action of the couple "Q".

In a similar manner, the difference between the vectors $T_{la}$ and $T_{ra}$, representing the reactions of the upper spring members at rest, and the vectors $T_{le}$ and $T_{re}$ representing the reactions of the upper spring members after the deflection, gives the resultant reactions $T_l$ and $T_r$ constituting a second couple acting in the same direction as the couple of forces $S_l$ and $S_r$ and oppoing the action of the torque Q.

The relations between the forces acting upon the stator may be expressed by the equation $$Q=2k_1\theta l^2+2k_2\theta l^2=2(k_1+k_2)\theta l^2=2K\theta l^2 \quad (24)$$

where $k_1$ is the scale of the upper spring members, $k_2$ is the scale of the lower spring members and $l$ is the distance from the point of action of the spring members to the center of rotation of the stator. It is seen that the reaction of the spring members produces a perfect couple under all conditions and does not introduce translational forces.

In the case where the stator is supported upon the lower spring members 83, with the upper spring members omitted, it may occur that the stator may rotate sufficiently to release one of the spring members, the right-hand spring member 83, for instance, from compression and the further movement of the stator would not be controlled by the reaction constituting a perfect couple producing a resultant translational force acting upon the stator tending to displace the same from the central position. It is one of the functions of the upper spring members to restrict the motion of the stator to a range wherein the lower spring members are continuously under compression in the same direction.

It may be seen from Equation (24) that the effect of the addition of the upper spring members is to make the resultant scale K of the resilient members co-operating with the stator larger than the scale of the lower spring members alone, thus producing the effect of a stiffer spring arrangement with a resultant decrease in the effectiveness of the vibration absorber. It is, therefore, important to employ such construction for the upper spring member that will make the increase of the resultant spring scale as small as possible and I accordingly employ a construction wherein a beam spring is supported at its ends and loaded at a single point in the middle thereof.

As seen from the curves in Figs. 13 and 14, the motion of the cushioned mass becomes smaller the better the vibration absorber operates, that is, the smaller the transmitting effect, (see Equations 10 and 10*a*), is. Since the transmitting effect becomes smaller in proportion to the decrease in the spring scale, it is important to make the scale of the springs as small as possible, that is, to use soft springs giving large deflections. In practical constructions, it is sufficient to secure the small spring scale for a relatively narrow range of movement around the neutral axis since under normal operation a good vibration absorber should restrict the motion of the stator to such range only. In order to prevent sudden impacts of the stator upon the supporting members of the foundation when occasionally rotated beyond the small range of normal movement, provision is made to produce the effect of an increased spring scale when the stator is moved beyond a predetermined range from its neutral position. In the vibration absorber illustrated in Figs. 3 and 4, I secure such a spring scale by providing sloped supporting surfaces on the supporting plate 25 and the pressure blocks 28, 32 and 35 at the points where they engage the beam springs 24 and 31.

Having selected a given spring construction with a view to obtaining the best utilization of the spring material, the actual spring dimensions are so determined as to give a spring scale required for securing a given tolerable transmitting effect and to maintain the maximum stresses in the spring material below a maximum, permissible value.

It can be shown that in the case of a spring construction employing rectangular springs of equal dimensions, with the lower springs loaded at two points and the upper springs loaded at one point, as shown in Figs. 3 and 4, the smallest dimension for the spring width $b$ is obtained when the ratio $\frac{a}{L}$ of the distance $a$ between the loading points and the supporting points to the length L of the spring is 0.15. In an arrangement entirely omitting the upper springs and employing doubly-loaded lower springs only, the smallest spring width is obtained for $$\frac{a}{L}=0.25.$$

The clearance under the springs or the stops limiting the range of deflections of the stator are so determined that the support becomes solid when the stress in the deflected springs reaches a predetermined maximum value.

In Fig. 5 is shown a modification of my invention wherein the lateral stator extension 13[a] is supported upon two sets of beam springs 91. The beam springs 91 are supported at their ends upon a liner plate 92 of tempered steel which rests on the pedestal 93 of the foundation. The stator member is compressed downwardly by means of a second set of beam springs 94 similar to the beam springs 91 through the action of a yoke 95 and bolts 96.

In Fig. 6 is shown another modification of my invention wherein the spring members are clamped to both the stator member and the foundation, and spring actions of the same character are secured for both downward and upward deflections, of the springs, permitting the full utilization of the spring material without an undue increase of the spring stiffness resulting from the employment of additional spring members for restricting the motion of the stator of a range wherein the lower spring aggregate is always compressed in the same direction. Two sets of spring members 101 and 102 have their ends secured to a pedestal 103 by means of bolts 104. The two spring members are spaced from each other by means of spreader blocks 105. The stator member 106 has a lateral projection 107 which extends into the space between the spring members is clamped to the same at two points 108 and 109 that are spaced from each other and from the ends of the spring members. By proper choice of the relative spacings between the points at which the spring members are clamped to the pedestal 103 and to the stator projection 107, respectively, any required degree of spring stiffness and loading efficiency may be secured.

In Fig. 7 is shown a modification of the arrangement shown in Fig. 6. Sets of double cantilever springs 111 are clamped in spaced relation to a standard or foundation 112 by means of bolts 113. The springs are spaced from each other by spreader blocks 114. A horizontal stator extension 115 is provided with spring nests 116 supporting hardened plates 117 co-operating with the free ends of the springs 111.

The hardened plates 117 are secured to the stator extensions 115 by means of bolts 119 and may have a sloped surface to give the springs a climbing scale.

In the construction shown in Fig. 7, the springs are initially bent upwardly and are brought into the horizontal position under the action of the stator weight. Such construction is not absolutely necessary, however, as the springs may be initially straight and bent downwardly in the neutral position when carrying the full stator weight. The latter construction is slightly cheaper since it saves the forming of the springs and permits the employment of straight spring beams.

In the constructions shown in Figs. 6 and 7, the load is carried on all of the springs and accordingly the stress is better distributed on the springs with a consequently better utilization of the resiliency of the same for the elimination of the undesirable effects of periodically acting forces.

In Fig. 8 is shown a modification of my invention which is of advantage in large machines wherein it is desirable to provide additional safety against displacement of the stator from its central position. The stator 121 is supported on coil springs 122 by means of lateral projections 123 extending in a horizontal plane through the axis of rotation. To prevent the stator from displacement in lateral and vertical directions without interfering with the slight rotational movement which is necessary for securing the action of the vibration absorbing springs 122, flexible straps 124 of resilient material such as steel are secured in a radial direction in the horizontal and vertical planes between projections 125 of the stator and the foundation.

Security against radial displacement of the stator may also be obtained by properly mounting the spring-members used in the arrangements shown in Figs. 3 to 8. A construction of such character, as applied to the vibration absorber shown in Fig. 7, is illustrated in Fig. 18. The portions 112′ and 114′ of the machine that clamp the springs 111 are provided with grooves holding the springs in a fixed lateral position and permitting the same to take up lateral thrust. The rectangular cross section of the springs presents a considerable larger resistance to deflections in the lateral direction than in the vertical direction.

Certain features of my invention are described in an article which appeared in the "Electrical Journal" for May, 1924.

My invention is not restricted to the particular arrangements and details of construction shown and described hereinbefore but may be utilized in a variety of other ways and I desire that the language of the appended claims shall be construed broadly to cover all modifications falling within the scope of my invention.

I claim as my invention:—

1. A member exposed to periodically varying forces tending to move the same, a second member co-operating with said first mentioned member to oppose said movement, and a resilient connection between said members comprising two flexed spring aggregates supported by one of said members and holding the other of said members therebetween, one of said spring aggregates comprising a beam spring held at its ends and flexed at one point intermediate said ends and the other of said spring aggregates comprising a beam spring held at its ends and flexed at two points spaced from each other and from said ends.

2. A machine comprising a rotor and a stator concentric with said rotor, a foundation for said machine, said stator being exposed to periodically varying forces tending to rotate the same around its axis, a pair of torque transmitting connections between said stator member and said foundation disposed at diametrically opposite sides of the stator, each connection comprising a stator member, a foundation member, a lower spring member, and an upper spring member, said stator member being held between said upper and lower spring members which are flexed against said foundation member, the upper spring member being arranged to restrict the motion of the stator to the working range of said lower spring member and having a relatively small spring scale as compared to that of the lower spring member.

3. A member exposed to periodically varying forces tending to move the same, a second member co-operating with said first mentioned member to oppose said movement and a resilient connection between said members comprising a plurality of beam springs of substantially identical dimensions arranged in two aggregates supported by one of said members and holding the other of said members therebetween, one of said spring aggregates comprising a beam spring held at its ends and flexed at one point intermediate said ends and the other of said spring aggregates comprising a beam spring held at its ends and flexed at two points spaced from each other and from said ends.

4. The combination with a dynamo-electric machine having a stator and a rotor, said stator being exposed to pulsating torsional forces, of a foundation, rotor-supporting bearings rigidly supported in a horizontal position upon said foundation, means for restraining said stator against any motion other than circular said means comprising a spring mounting constituting the sole support of said stator upon said foundation, said mounting comprising legs extending from substantially diametrically opposite sides of the stator in a horizontal central plane therethrough, a pedestal member rigidly extending from said foundation on each side of the stator to support the corresponding leg, and resilient beam springs supported by the pedestals and carrying said legs, said springs lying substantially parallel to the rotor axis and having substantially horizontally extending flat sides.

5. The combination with a dynamo-electric machine having a stator and a rotor, said stator being exposed to pulsating torsional forces, of a foundation, rotor-supporting bearings rigidly supported in a horizontal position upon said foundation, and a spring mounting constituting the sole support of said stator upon said foundation, said mounting comprising legs extending from substantially diametrically opposite sides of the stator in a horizontal central plane therethrough, a pedestal member rigidly extending from said foundation on each side of the stator to support the corresponding leg, each pedestal having a supporting member disposed below the legs, a lower beam spring carried by said supporting member and underlying the leg to support said stator, an upper beam spring disposed on the top of the leg, a yoke for downwardly pressing said upper beam spring and means for fixing the distance of said yoke from said supporting member to determine the normal position of the stator with respect to the foundation.

6. A dynamo-electric machine comprising a stator and a rotor having a pulsatory torque, and beam spring supports on opposite sides of the stator and having flat sides disposed substantially radially whereby they are adapted to yield only in substantially tangential directions with respect to the rotor at the points of application of the spring supports.

7. The combination with a dynamo-electric machine having a stator and a rotor, said stator being exposed to pulsating torsional forces, of a foundation, rotor-supporting bearings rigidly supported upon said foundation, and a spring mounting constituting the sole support of said stator upon said foundation and comprising stator legs and beam springs secured to said legs and said foundation at spaced points, respectively, said springs being disposed parallel to the stator axis and having a rectangular cross section of which two sides are disposed in a substantially radial direction with respect to the center of the machine and are longer than the other sides.

8. A variable-torque dynamo-electric machine and support having in combination, a dynamo-electric machine, a frame, a plurality of beam springs rigidly secured to the frame and the machine and arranged on opposite sides of the machine substantially radially with respect to the motor axis, the springs being stiff in radial and longitudinal directions to support the machine and to prevent substantial bodily movement thereof, and springy in the direction normal to the radial to permit rotational vibrations of the machine due to variations of machine torque without transmission thereof to the frame.

9. A variable torque dynamo electric machine and support having in combination, a dynamo electric machine, a frame, a plurality of flat arms rigidly secured to the frame and the machine and arranged at each side of the machine substantially radially with respect to the machine axis, the arms being stiff in radial and longitudinal directions to support the machine and to prevent substantial bodily movement thereof, and springy in the direction normal to the radial to permit rotational vibrations of the machine due to variations of machine torque without transmission thereof to the frame.

In testimony whereof, I have hereunto subscribed my name this 23rd day of September, 1932.

CARL R. SODERBERG.